United States Patent [19]
Travin et al.

[11] 3,715,606
[45] Feb. 6, 1973

[54] METHOD OF PULSE CONTROL OF HIGH-VOLTAGE RECTIFIERS, FOR EXAMPLE THYRISTORS, OPERATING IN A POLYPHASE CONVERTER, AND A CONTROL SYSTEM TO REALIZE SAID METHOD

[76] Inventors: Lev Viktorovich Travin, Leninsky prospekt, 101, korpus 136, kv. 125; Valentin Georgievich Spuv, ulitsa Tukhachevskogo, 28, korpus 1, kv. 49, both of Moscow, U.S.S.R.

[22] Filed: Dec. 24, 1970

[21] Appl. No.: 101,348

[52] U.S. Cl. ......307/252 Q, 307/252 UA, 323/22 SC
[51] Int. Cl. ..............................................H03k 17/00
[58] Field of Search........307/252 Q, 252 UA, 252 N, 252 T, 307/252 W; 323/22 SC

[56] References Cited

UNITED STATES PATENTS 3,283,179  11/1966  Carlisle et al. .....................307/252 T
3,281,645  10/1966  Spink.................................307/252 Q
3,437,904  4/1969  Jednacz............................307/252 Q Primary Examiner—John Zazworsky
Attorney—Waters, Roditi, Schwartz & Nissen

[57] ABSTRACT

A method and system are characterized in that narrow control pulses are applied to the rectifiers in the presence of a positive voltage across them at the beginning of their conduction interval and at the subsequent passages of the voltage across each rectifier through zero from a negative to a positive value during the entire conduction interval of the rectifier. The method keeps to a minimum overvoltages in converters operating in the 0-1 mode and completely eliminates the presence of a positive signal at the control electrodes of the thyristors dangerous to them.

5 Claims, 5 Drawing Figures

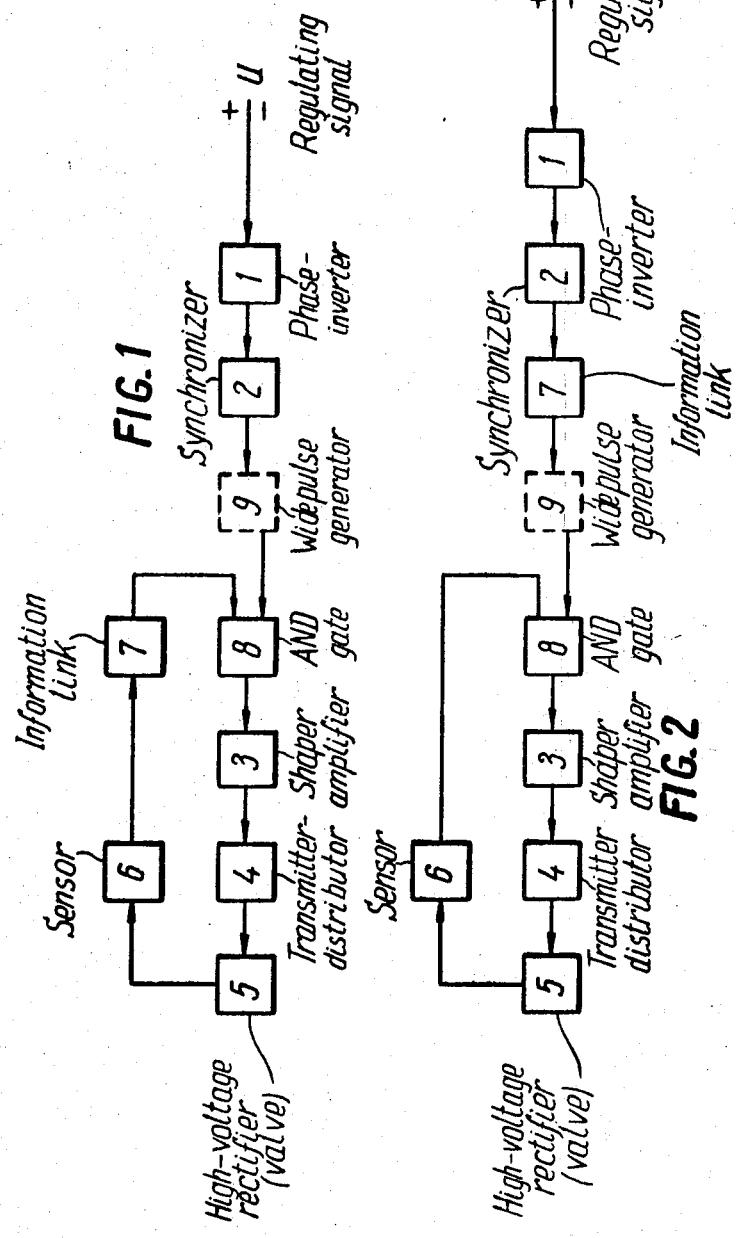

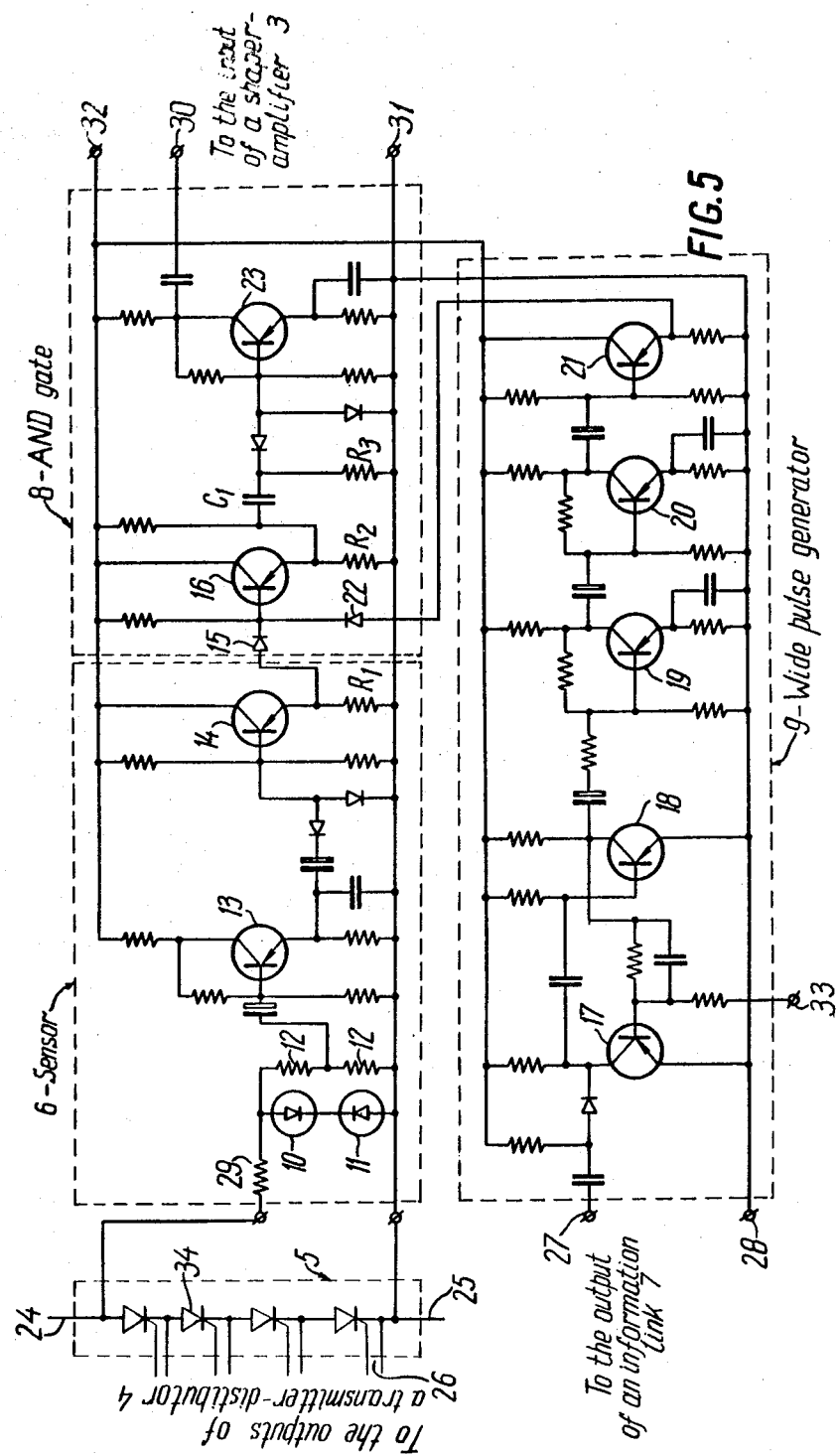

METHOD OF PULSE CONTROL OF HIGH-VOLTAGE RECTIFIERS, FOR EXAMPLE THYRISTORS, OPERATING IN A POLYPHASE CONVERTER, AND A CONTROL SYSTEM TO REALIZE SAID METHOD

The present invention relates to the control of high-voltage converters, and more specifically to a method for the pulse control of high-voltage rectifiers such as, for example, thyristor valves or high-voltage mercury-arc valves operating in a polyphase converter, and to a system for the pulse control of such rectifiers.

High-voltage thyristor valves or high-voltage mercury-arc valves are essential elements of any high-voltage polyphase converter and are used as the arms of the converter. A high-voltage thyristor valve also designated herein "a high-voltage thyristor unit" usually consists of a large number of thyristors connected in series-parallel together with all necessary auxiliary circuits for voltage and current distribution between thyristors, protection of thyristors, and so forth.

The requirements that systems for the pulse control of high-voltage rectifier units should meet may be divided into two groups. The requirements in the first group stem from the fact that a large number of thyristors connected in series-parallel have to be switched on simultaneously and consist essentially in that control pulses should have a sufficiently large amplitude, a sufficiently high rise time, and a sufficiently long duration, and that there should be the least possible difference in waveform and in time between the pulses applied to the thyristors of the same unit. The fulfilment of these requirements serves to maintain a uniform distribution of the voltage between the series-connected thyristors at the instant when the high-voltage thyristor unit is turned on.

The requirements in the second group are pivoted to the mode of operation of and the transients in a particular converter such as, for example, a twelve-phase cascoded-bridge converter which is made up of two series-connected three-phase bridge circuits and is widely used in d.c. power transmission lines. In such a case, the principal mode of operation determining the characteristics of the control pulses is such that the rectifiers (units) in the bridge circuit are conducting in turn and one at a time which is known as the 0-1 mode. This mode may occur in a number of transients accompanied by a decrease in the rectified current in the associated d.c. power transmission line, such as when the d.c. power transmission line is turned on or off, or automatically reclosed, or when bridge is being shorted out or brought in to circuit, or when it is being changed over to inverter operation, and the like. The 0-1 mode is characterized by the fact that at the instant when control pulses are applied to the rectifiers of the anode and cathode groups, the voltages across them may be of opposite polarities.

In such a case, if the duration of the control pulses is short, only that rectifier will fire which accepts a positive voltage. This rectifier will pass the re-charging current of the circuit capacitance (for example, that of a converter transformer) to ground and will extinguish after this current has passed through zero. When narrow control pulses are applied to a next pair of rectifiers, a rectifier in the other group will fire, and the events will be repeated all over again. This chain of events results in considerable overvoltages in the converter, which is dangerous to the insulation of the equipment. Furthermore, the voltage across the converter rectifiers may repeatedly change sign during their normal conduction interval.

A normal conduction interval of a rectifier in a converter circuit is a time interval during which the valve is carrying current, when the converter is in a normal steady-state mode of operation and the direct current of the converter is continuous. A normal conduction interval of a rectifier depends on the circuit of the converter where it is used; e.g., the normal conduction interval of any rectifier (arm) in a three-phase bridge converter is equal to one-third of the period of the a.c. voltage supplied to the converter plus the overlap angle.

As the circuit capacitances are re-charged, the voltage across the other "dead" rectifier grows positive and, if a control pulse is applied to it at that instant, it will fire, thereby upsetting the 0-1 mode and limiting overvoltages.

An analysis of operation of mercury-arc rectifiers in the converters of d.c. power transmission lines has shown that the best method to limit overvoltages in the 0-1 mode of operation is to use a control pulse the duration of which exceeds the re-charge time when one rectifier fires. As applied to the control of mercury-arc rectifiers, this means that each rectifier should be driven with a single broad control pulse 120 electrical degrees wide (see, for example, U.S. Pat. No. 3218541, Class 321–48, 1965, "POLYPHASE ELECTRICAL CONVERTER").

Broad control pulses with a duration equal to the conduction interval of the rectifier fully eliminate the occurrence of the 0-1 mode, but his method of control suffers from a number of disadvantages when it is used to control high-voltage thyristor units:

in most existing systems for control of high-voltage thyristor units the circuits responsible for the distribution of control pulses between the thyristors of a unit cannot transmit control pulses of such a duration, while in other control systems this requirement entails complications in the circuit configurations;

with such a duration of control pulses, it is difficult to secure a pulse rise time of $0.2 - 3\mu$ sec, especially in view of the necessity to insure the requisite insulation level of the control circuits.

As regards a high-voltage thyristor unit, this pulse rise time is necessary so that the applied voltage can be uniformly divided among the hundreds of series-connected thyristors, because in this case the difference in time of firing between the individual thyristors is reduced to a minimum.

In order to eliminate these disadvantages, the single broad pulse is known to have been replaced with a series of short control pulses such that the duration of the pulse series is equal to the conduction interval of the rectifier (see, for example, U.S. Pat. No. 3315098, Class 307–88.5, 1967, "GATING CIRCUIT FOR CONTROLLED RECTIFIER").

A series of narrow control pulses eliminates the above mentioned disadvantages but the overvoltages occurring in the converter in the 0-1 mode may still be considerable and will depend on the duration of and the spacing between the narrow control pulses.

Besides, both of the above mentioned methods suffer from other disadvantages:

1. With a single broad pulse or a series of narrow pulses used to control a high-voltage thyristor unit, and with the converter operating on an intermittent current, a case is inevitable when in the presence of a positive control pulse the voltage across the high-voltage thyristor unit is negative. In such a case, the reverse currents of the thyristors grow tens or even hundreds of times, which can increase the power dissipated by the thyristors to a point where a thermal break-down can occur, and also a non-uniform division of the inverse voltage among the hundreds of series-connected thyristors of the unit and, as a result, the electrical break-down of some of them. Because of this, broad pulses or a series of narrow pulses may prove unsuitable for control of a high-voltage thyristor unit.

2. Circuits shaping and amplifying broad control pulses or a series of narrow control pulses draw much power, and this entails an increase in the power dissipated by the mercury-arc rectifier or high-voltage thyristor unit proper and stands in the way of utilizing a very promising method by which a mercury-arc rectifier or high-voltage thyristor unit draws its feed voltage directly from the applied voltage.

An object of the present invention is to eliminate the above mentioned disadvantages.

A more specific object of the invention is to provide a method for the pulse control of high-voltage rectifiers used in polyphase converters and a control system based on the method disclosed herein, which minimize overvoltages in conversion circuits operating in the 0-1 mode, completely eliminate the appearance of the dangerous positive signal at the control electrodes (gates) of the thyristors in the unit when there is a negative voltage across that unit, and simplify the problem of feeding the circuit shaping and amplifying the control pulses directly with the voltage applied to the thyristor unit.

These objects are accomplished by the fact that in the method disclosed herein for the pulse control of high-voltage rectifiers used in polyphase converters, based on the application of narrow control pulses to the rectifiers (i.e., to the gates of the thyristors of high-voltage thyristor valves or to the grids of mercury-arc valves), the said narrow control pulses are, according to the invention, applied to the rectifiers in the presence of a positive voltage at them, at the beginning of their conduction interval and at the subsequent instants when the voltage across each rectifier passes through zero from a negative to a positive value during the entire conduction interval of the rectifier.

In a system for the pulse control of said high-voltage rectifiers, comprising a phase-inverter to change the phase of control pulses, a synchronizer to furnish pulses which determine the onset and duration of the conduction intervals of the rectifiers, a control-pulse shaper-amplifier, and a device to distribute said control pulses, there is, according to the invention, for each rectifier a feedback circuit comprising a device sensing the polarity and passage of the rectifier voltage (the voltage across said rectifier or valve) through zero, an information link for linking the system elements having different potentials, and an AND gate one input of which is connected to the output of the synchronizer, the other input of which is connected to the output of the sensor of the polarity and passage of the rectifier voltage through zero, and the output of the AND gate is connected to the input of the control-pulse shaper-amplifier.

This arrangement enables narrow control pulses to be applied to the rectifiers in the presence of a positive voltage across them, at the beginning of their conduction interval and at the subsequent instants when the voltage across each rectifier passes through zero from a negative to a positive value during the entire conduction interval of the rectifier.

To transmit information about the instants when the rectifier voltage passes through zero from a negative to a positive value during the conduction interval of the rectifier, it is preferable to arrange the information link between the sensor of the polarity and passage of the rectifier voltage through zero and the second input of the AND gate.

To transmit information about the onset and duration of the conduction intervals of the rectifier, the information link may be arranged between the synchronizer and the first input of the AND gate.

In case where use is made of a source of narrow synchronizing pulses, between the output of the synchronizer and the first input of the AND gate there should preferably be a pulse circuit to transform the narrow synchronizing pulses into broad pulses with a duration equal to the conduction interval of the rectifier. The pulse circuit may be a one-shot multivibrator.

The method and system for pulse control of high-voltage rectifiers disclosed herein offer a number of advantages over their control by means of broad control pulses or a series of narrow control pulses, namely:

the method disclosed herein is applicable to any system of distribution of control pulses among the thyristors of a unit, especially as regards the promising light-control systems;

the method keeps to a minimum overvoltages in the converter operating in the 0-1 mode, while in cases where use is made of a series of narrow control pulses the magnitude of overvoltages in the 0-1 mode depends on the duration of and the spacing between the narrow control pulses;

the method completely eliminates a mode of operation dangerous to the thyristors of the unit, namely, the presence of a positive signal at the control electrodes (gates) of the thyristors of the unit when there is a negative voltage across the thyristor unit;

in most systems for control of high-voltage thyristor units the control-pulse shaper-amplifier is at the potential of the unit platform and is controlled from the ground by means of a light information link. In such cases, the control-pulse shaper-amplifier obtains its feed voltage either from the control-power source of the substation via expensive isolating transformers or, as is more attractive, directly from the voltage applied to the thyristor unit. However, as the control-pulse shaper-amplifier draws more power, this scheme becomes more and more difficult to realize. Since by the method disclosed herein the control-pulse shaper-amplifier is to furnish only several narrow control pulses, it draws much less power than circuits shaping and amplifying broad control pulses or a series of narrow control pulses. As a consequence, the method for control of high-voltage rectifiers disclosed herein simplifies the problem of feeding the control-pulse shaper-amplifier directly with the voltage across the thyristor unit.

It should be noted that the method and system disclosed herein are also applicable to the control of mercury-arc rectifiers.

The invention will be more fully understood from the following more detailed description of a method for pulse control of high-voltage rectifiers and a system for control of these rectifiers, when read in connection with the accompanying drawings wherein:

FIG. 1 is a block-diagram of an embodiment of the invention in the form of a system for the control of one converter rectifier, in which an information link is arranged between a device sensing the polarity and passage of rectifier voltage through zero and the second input of AND gate;

FIG. 2 is a block-diagram of a modification of the system of FIG. 1, in which the information link is arranged between a synchronizer and the first input of the AND gate;

FIG. 5 is a schematic diagram of a second embodiment of the invention in the form of a system for the pulse control of a converter rectifier.

Figure 3:
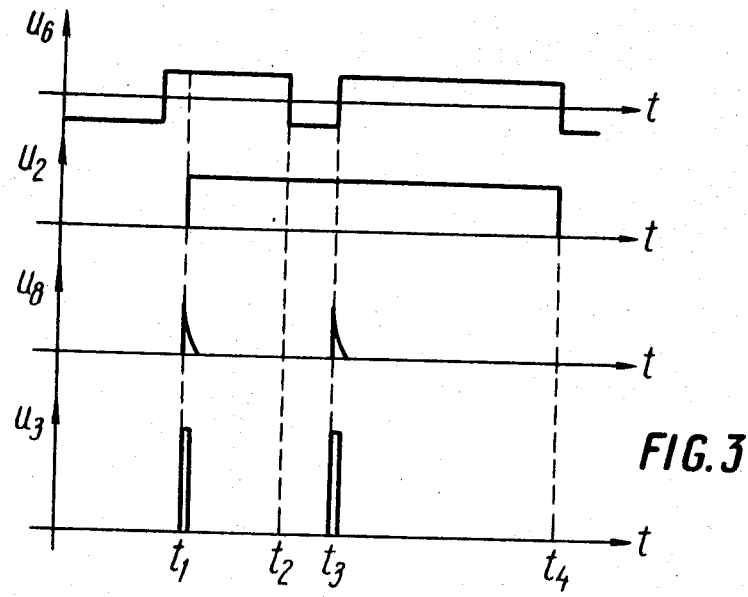
FIGS. 3 and 4 are voltage waveforms illustrating operation of the system disclosed herein.

The method and a system for its realization as disclosed herein will next be considered as applied to the pulse control of one high-voltage rectifier operating in a polyphase converter.

In each of FIGS. 1 and 2, there is a system for the control of a converter rectifier, said system comprising the following key components: a phase-inverter 1 to change the phase of control pulses within the requisite limits determined by the regulating signal $u$ applied to its input; a synchronizer 2 to furnish pulses which determine the onset and duration of the conduction interval of the rectifier; a shaper-amplifier 3 to shape and amplify control pulses; and a device 4 to transmit and distribute control pulses to the control electrodes of the rectifier 5.

Additionally, the control system has, according to the invention, a feedback circuit comprising a device 6 sensing the polarity and passage of the voltage across the rectifier 5 through zero from a negative to a positive value, an information link 7 to link the circuit components having different potentials, and an AND gate 8.

The control system with said feedback circuit has some of its components at ground potential and some of them at the high-voltage potential of a rectifier (or its platform). The information link 7 in FIGS. 1 and 2 is provided not only to link the corresponding system components having different potentials, but also to provide the necessary isolation between them, as will be shown hereinbelow.

The system in FIG. 1 just described operates as follows:

The signal carrying information about the requisite firing angle (the instant of the beginning of the conduction interval of the rectifier 5) goes from the phase-inverter 1 to the input of the synchronizer 2 at the output of which there appears a broad rectangular pulse. The leading edge of this pulse determines the requisite firing angle, and its duration is equal to the specified conduction interval of the rectifier 5. The conduction interval may be constant and decided solely by the chosen configuration of the converter circuit, or it may be a variable one (during transients) and decided by both the converter circuit and the intervals between the instants at which the switching rectifiers (in one group of the converter rectifiers) fire in the process of regulating the firing angles.

The broad pulse appearing across the output of the synchronizer 2 goes to one of the inputs of the AND gate 8. The other input of the AND gate is fed via the information link 7 (which may be a pulse isolating transformer, a light link, a radio link, and the like) with a sequence of pulses from the sensor 6 connected in parallel with the rectifier 5, which represent the polarity and passage of the rectifier voltage 5 through zero. As a result of the subsequent differentiation, the output of the AND gate delivers narrow pulses at the beginning of the synchronizing pulse (if the voltage across the rectifier is positive then) and also each time the rectifier voltage passes through zero from a negative to a positive value during the conduction interval equal to the duration of the synchronizing pulse. These pulses go to the input of the shaper-amplifier 3 and, after being properly shaped and amplified, the narrow control pulses are routed by the control-pulse distributor 4 to the control electrode of the high-voltage rectifier 5.

The number of pulses at the output of the AND gate and, as a consequence, the number of control pulses applied to the rectifier 5 during one conduction interval is automatically decided by the number of passages of the rectifier voltage through zero during the conduction interval from a negative to a positive value. In most cases, when a converter is operating under steady-state conditions and with a direct current flowing continuously, a positive voltage is applied across each rectifier of a converter during its entire conduction interval; i.e., this voltage does not change sign during the conduction interval, and, each rectifier is driven by only one narrow control pulse at the beginning of the conduction interval. In the control system disclosed herein, control pulses cannot be applied to a rectifier outside the conduction interval or when there is a negative voltage across the rectifier at any instant during the conduction interval.

The block-diagram of the control system of FIG. 1 applies to a case when the key elements of the control system, namely the phase-inverter 1, the synchronizer 2, the AND gate 8, and the control-pulse shaper-amplifier 3 are at ground potential, and the sensor 6 is at the platform potential of the rectifier 5. The requisite isolation of the control-system elements held at different potentials is insured by the control-pulse distributor 4 and the information link 7. The system represented by the block-diagram of FIG. 1 is particularly convenient when the thyristors of a high-voltage thyristor unit are light-radio controlled.

In cases where the control of the rectifiers 5 utilizes a transformer, a cable-transformer, or any other electromagnetic system for the transmission and distribution of control pulses, it is preferable to place the above listed elements 3, 4, 6 and 8 of the control system at the rectifier platform, and to transmit a synchronizing pulse with a duration equal to the conduction interval from the synchronizer 2 (held at ground potential) to the AND gate (held at the potential of the rectifier platform) via the information link 7. The block-diagram of such a control system is shown in FIG. 2. The system operates in much the same way as that shown in FIG. 1, with the only exception that in this case the information link 7 transmits from the synchronizer 2 to gate 8 synchronizing pulses and not information about the voltage across the rectifier 5, as is the case in the system represented by the block-diagram of FIG. 1.

Figure 4:
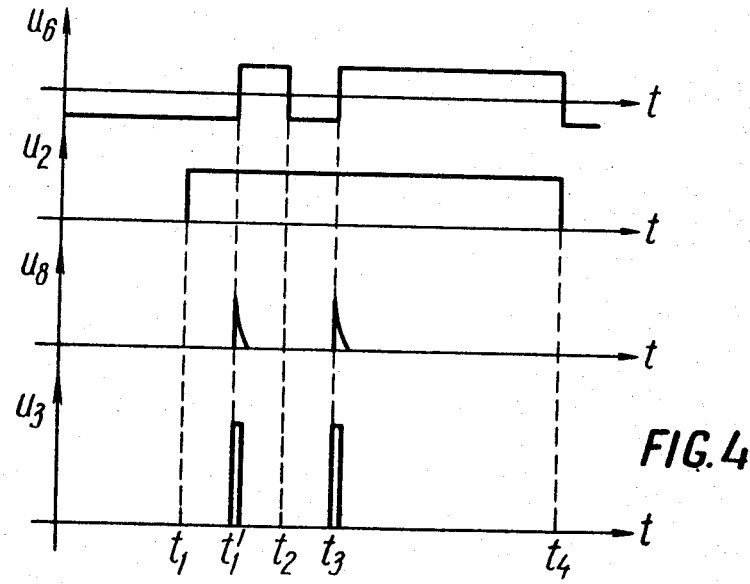

The voltage waveforms shown in FIGS. 3 and 4 illustrate operation of the system in a case when at the beginning of the conduction interval, $t_1$, a positive voltage is applied to the rectifier 5 (FIG. 3) and when the voltage across the rectifier 5 at the same instant $t_1$ is negative (FIG. 4).

For simplicity, it is assumed that during the conduction interval $t_1 - t_4$ the rectifier 5 goes out only once (at time $t_2$), that a negative voltage is applied to it during the interval $t_2 - t_3$, and that at time $t_3$ the voltage across the rectifier 5 again becomes positive. The following notation is adopted in FIGS. 3 and 4: $u_6$ is the voltage across the output of the sensor 6, applied to the first input of the AND gate and representing the specified conduction interval of the rectifier 5; $u_2$ is the voltage across the output of the synchronizer, applied to the second input of the AND gate; $u_8$ represents the narrow pulses (after differentiation) across the output of the AND gate; $u_3$ represents the control pulses appearing across the output of the shaper-amplifier 3 and applied to the rectifier via the pulse distributor 4.

In the first case FIG. 3), the control pulses are applied to the rectifier 5 at time $t_1$ corresponding to the onset of the conduction interval (at this instant, the polarity of $u_6$ corresponds to a positive voltage across the rectifier 5) and at time $t_3$ corresponding to the passage of the rectifier voltage through zero from a negative to a positive value.

In the second case (FIG. 4), the first control pulse is applied to the rectifier 5 at time $t_1'$, that is, at the instant when the rectifier voltage passes through zero for the first time (since at time after the beginning of the conduction interval of the rectifier 5 at $t_1$ $t_1$ the voltage across the rectifier 5 is negative), and the second control pulse is applied at time $t_3$ corresponding to the second passage of the voltage across the rectifier 5 through zero. At any other instants, no control pulses are formed or applied to the rectifier 5.

In some cases, the synchronizer is arranged so that instead of a broad control pulse it delivers either one narrow pulse determining the onset of the conduction interval or two narrow pulses determining the onset and termination of the conduction interval. For example, in the system represented by the block-diagram of FIG. 2, instead of a broad synchronizing pulse, it may sometimes be preferable to transmit from the synchronizer 2 and over the link 7 either one narrow pulse determining the onset of the conduction interval or two narrow pulses determining the onset and termination of the conduction interval. In all such cases, it is preferable to place an additional pulse circuit 9 (shown by the dashed blocks in FIGS. 1 and 2 between the synchronizer 2 and the AND gate to convert the narrow synchronizing pulses into broad synchronizing pulses the duration of which is equal to the specified conduction interval of the rectifier. This pulse circuit may be a flip-flop triggered by two narrow pulses from the synchronizer 2 (in the case of a variable conduction interval) or a one-shot multivibrator triggered by one narrow synchronizing pulse (in the case of a fixed conduction interval).

FIG. 5 is the schematic diagram of the elements 6, 8 and 9 of the system disclosed herein according to FIG. 2, where the said elements 6, 8, and 9 are held at the platform potential of the rectifier 5.

The rectifier 5 is shown in FIG. 5 is a high-voltage thyristor valve, consisting of a large number of thyristors 34 connected in series; the auxiliary circuits of the high-voltage thyristor valve are not shown in FIG. 5. The valve has an anode terminal 24, a cathode terminal 25 and control terminals 26, connected with the control electrodes (gates) of the thyristors of the valve. The anode and cathode terminals 24, 25 of the high-voltage thyristor valve are connected to the corresponding points of a converter (not shown in FIG. 5). The platform (base) of the valve has the potential of its cathode, which is a high-voltage potential relative to ground.

Phase-inverter 1 and synchronizer 2 are of any usual type producing a narrow synchronizing pulse at the beginning of each conduction interval of the high-voltage thyristor valve 5 and are placed at ground potential. The information link 7 which is of a known type and may be a pulse-isolating transformer or a system consisting of a light-pulse source, an optical channel and a light-pulse receiver provides the link between the synchronizer 2 and the one-shot multivibrator-amplifier 9 and the required isolation between them. The input terminals 27, 28 of the element 9 are connected to the output of the information link 7.

The sensor of the polarity and passage of the rectifier voltage (the voltage across the high-voltage thyristor valve 5) through zero incorporates a resistor 29 of high resistance a symmetrical Zener-diode voltage limiter built around Zener diodes 10 and 11, a voltage divider 12 and a two-stage amplifier based on transistors 13 and 14.

The output signal of the sensor 6 (the voltage developed across a resistor $R_1$) is applied to the first input (a diode 15) of the AND gate 8 built around the transistor 16. The narrow synchronizing pulse coming from the synchronizer 2 over the information link 7 is applied to the input 27, 28 of the one-shot multivibrator 9 based on transistors 17 and 18, which delivers a broad pulse the duration of which is equal to the conduction interval of the rectifier 5, decided by the configuration of the converter circuit. After amplification by a three-stage amplifier using transistors 19, 20 and 21, this broad pulse is applied to the second input (a diode 22) of the AND gate. The signals at the output of the AND gate (the voltage across a resistor $R_2$) will appear only when the respective signals are applied simultaneously to both inputs of the AND gate. The narrow pulses produced as a result of differentiation by a $C_1R_3$ network are amplified by a pre-amplifier built around a transistor 23 and are then applied via output terminals 30 and 31 or the coincidence gate 8 to the control-pulse shaper-amplifier 3.

The control-pulse shaper-amplifier 3 forms and amplifies control pulses with specified amplitude, duration and rate-of-rise, which are applied to the control electrodes (gates) 26 of the high-voltage thyristor valve 5 via a control pulse distributor 4. The shaper-amplifier 3 and the control-pulse distributor 4 are of known kinds and may be either a power pulse generator with a set of isolating pulse transformers, or a source of power light pulses with a set of optic fiberglass guides and with a set of circuits (one such circuit for one individual thyristor or for several thyristors) transforming light pulses into electrical control pulses of required amplitude, duration and rate-of rise. Other configurations and constructions of elements 3 and 4 are also possible.

The power supply of elements 6, 8 and 9 of the control system in FIG. 5 (and elements 3 and 7 if necessary) may be accomplished by any known supply means via the supply terminals 31, 32 and 33 in FIG. 5, e.g., by a battery, by an isolating supply transformer and rectifier (from an auxiliary a.c. network of a converter) or more preferably by a rectifier supplied from the voltage across the high-voltage thyristor valve via grading or damping circuits of this valve.

The same configurations of sensor 6, coincidence gate 8 and one-shot multivibrator 9 as shown in FIG. 5 may be used in the control system shown in FIG. 1. The rectifier 5 in FIGS. 1 and 2 may be a high-voltage mercury-arc valve instead of a high-voltage thyristor valve.

What is claimed is:

1. A system for pulse control of high-voltage rectifiers including control electrodes and having conduction intervals and operating in a polyphase converter, comprising a plurality of system components adopted to operate at different potentials and including a phase-inverter to vary the phase of control pulses and including an output; a synchronizer including an output and connected to the output of said phase-inverter and determining the onset and duration of conduction intervals of the rectifiers; a control-pulse shaper-amplifier including an output and an input; a control-pulse distributor connected to the output of said shaper-amplifier to transmit and distribute control pulses to the control electrodes of the rectifier; a feedback circuit comprising a sensor including an output and sensing the polarity and passage of the rectifier voltage through zero and connected in parallel with the rectifier, an information link for linking the system components operating at different potentials, and an AND gate including two inputs one of which is connected to the output of said synchronizer and the other of which is connected to the output of said sensor of the polarity and passage of the rectifier voltage through zero, said gate including an output connected to the input of said control-pulse shaper-amplifier, while said feedback circuit enables narrow control pulses to be applied to the rectifier in the presence of a positive voltage across it at the beginning of its conduction interval and also at the subsequent instants when the rectifier voltage passes through zero from a negative to a positive value during the entire conduction interval of the rectifier.

2. A system, as claimed in claim 1, in which to transmit information about the instants when the rectifier voltage passes through zero from a negative to a positive value during the conduction interval of the rectifier the information link is arranged between the sensor of the passage of the rectifier voltage through zero and the second input of the AND gate.

3. A system, as claimed in claim 1, in which to transmit information about the onset and duration of conduction intervals of the rectifier the information link is arranged between the synchronizer and the first input of the AND gate.

4. A system, as claimed in claim 1, comprising a pulse circuit and in which, when use is made of a source of narrow synchronizing pulses, said pulse circuit, which is coupled between the output of the synchronizer and the first input of the AND gate, transforms the narrow pulses of the synchronizer into broad pulses the duration of which is equal to the conduction interval of the rectifier.

5. A system, as claimed in claim 4, in which said pulse circuit is a one-shot multivibrator.

* * * * *